Figure 1:
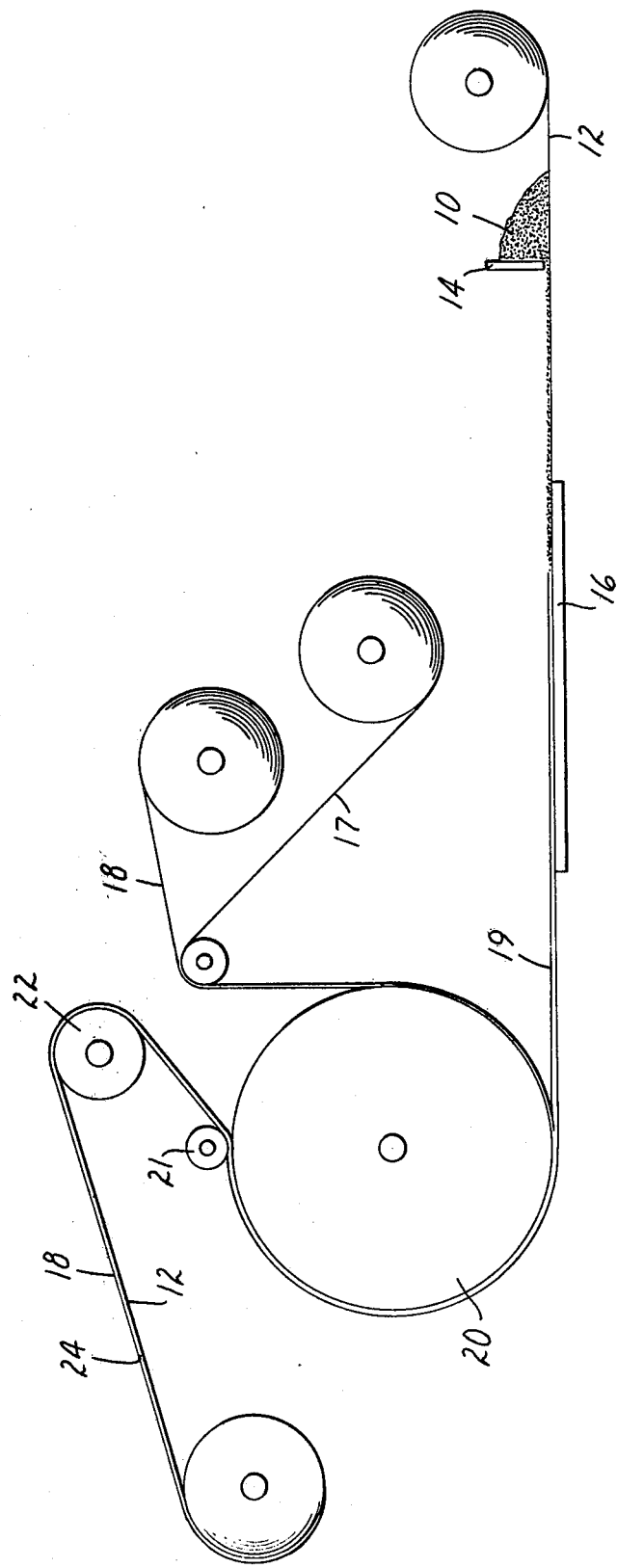

United States Patent [19]

Marteness

[11] 4,292,110
[45] Sep. 29, 1981

[54] FABRIC-REINFORCED BONDING SHEET COMPRISING AN EPOXY RESIN AND DIANILINE AND USE THEREOF TO MAKE AN INSULATED RAIL JOINT

[75] Inventor: Bruce A. Marteness, Inver Heights, Minn.

[73] Assignee: Minnesota Mining and Manufacturing Company, St. Paul, Minn.

[21] Appl. No.: 59,617

[22] Filed: Jul. 23, 1979

[51] Int. Cl.³ .................. B32B 3/26; B32B 17/04; B32B 27/26; B32B 27/38
[52] U.S. Cl. ............................... 156/92; 156/330; 156/304.3; 156/306.9; 238/152; 238/159; 238/160; 238/161; 428/255; 428/262; 428/272; 428/273; 428/290; 427/398.1
[58] Field of Search ............ 156/330, 304; 428/255, 428/262, 272, 273, 290; 238/152, 159, 160, 161

[56] References Cited

U.S. PATENT DOCUMENTS

| | | | |
|---|---|---|---|
| 3,365,516 | 1/1968 | Prescott et al. | 260/30.4 EP |
| 3,390,037 | 6/1968 | Christie et al. | 428/415 |
| 3,416,728 | 12/1968 | Hamilton | 238/152 |
| 3,528,609 | 9/1970 | Mitgau | 238/152 |
| 3,562,198 | 2/1971 | Slocombe | 260/33.6 EP |
| 3,698,634 | 10/1972 | Hamilton | 238/152 |
| 3,719,724 | 3/1973 | Freeman | 156/330 |
| 3,794,609 | 2/1974 | Metil | 260/30.4 EP |

OTHER PUBLICATIONS

Chemical Abstracts, 72 (1970) 79817q and 79818r.
Chemical Abstracts, 88 (1978) 38479t.

*Primary Examiner*—James C. Cannon

[57] ABSTRACT

Fabric-reinforced adhesive bonding sheet, the adhesive of which is a blend of epoxy resin and a dianiline which soften and melt at 50°–110° C. The bonding sheet is especially useful for making insulated rail joints.

13 Claims, 2 Drawing Figures

FABRIC-REINFORCED BONDING SHEET COMPRISING AN EPOXY RESIN AND DIANILINE AND USE THEREOF TO MAKE AN INSULATED RAIL JOINT

BACKGROUND OF THE INVENTION

The main lines of almost all U.S. railroads employ welded track which is continuous except at insulated rail joints for electrical signals. Most insulated rail joints are comprised of fishplates or joint bars which are adhesively bonded to the rails in order to fix the gap and virtually to eliminate relative movement between the abutting rails. Typically the adhesives are two-part resin compositions which cure to a thermoset state.

Two-part systems are messy and difficult to use. The two-parts must be thoroughly mixed and then troweled onto a reinforcing fabric which provides sufficient bulk to insure adequate electrical insulation if the joint bars are metal. After the rails and joint bars have been heated by a torch, the resin-impregnated fabric is laid between the rails and joint bars, and bolts are inserted and tightened. If either the temperature is too high or there is a delay in completing the assembly, the resin can begin to gel before the bolts are tightened, thus resulting in an inferior adhesive bond.

Because of such problems, most railroads prefer to bond two sections of rail in a shop under well-controlled conditions, and subsequently to weld the bonded sections into the track. Not only is this a rather cumbersome, expensive procedure, but field welds tend not to be as reliable as the shop welds in the balance of the track.

OTHER PRIOR ART

Blends of high-melting epoxy resins and methylene dianiline are known to be stable for months at ordinary ambient temperatures and to fuse and then cure quickly when heated to moderately elevated temperatures. Nearly full bonding strength is reached quickly after gelling, whereas most latent epoxy resin compositions require a post-cure to reach substantially full strength.

THE PRESENT INVENTION

The present invention provides electrically-insulated rail joints which can reliably be made in the field and are more convenient to make as compared to the two-part epoxy systems of the prior art. Briefly, the present invention concerns a fabric-reinforced bonding sheet comprising at least one layer of a reinforcing fabric saturated with an intimate blend of (a) 1,2-epoxy resin having a Durrans' softening point of 50°-110° C. and (b) a dianiline having a melting point of 50°-110° C. in approximately stoichiometrically equivalent amounts (namely, within about 15 percent of stoichiometry, preferably within ten percent). If either the Durrans' softening point of the epoxy resin or the melting point of the dianiline were substantially below 50° C., the intimate blend might cure appreciably before putting the bonding sheet to use, unless refrigerated. Preferably their softening and melting points are each at least 70° C. so that at ordinary room temperatures they can be either pulverized together or individually pulverized and then admixed to provide fine powder mixtures that can be stored indefinitely at ordinary room temperatures without danger of blocking. If the Durrans' softening point of the epoxy resin or the melting point of the dianiline were substantially above 110° C., the high temperatue required to fuse them together to provide an intimate blend could produce an undue degree of cure before the bonding sheet could be put to use. Also, the railroads prefer to employ the lowest possible temperature in making the rail joints.

Ideally the Durrans' softening point of the epoxy resin is so selected that at the temperature at which the dianiline melts, its viscosity is substantially the same as that of the dianiline. In order to achieve that relationship, it may be necessary to formulate the epoxy resin from a mixture of two epoxy resins, one having a Durrans' softening point above the other, below the melting point of the dianiline.

The fabric-reinforced bonding sheets made with epoxy resin and dianiline having softening and melting points of 60°-110° C. can be stored at ordinary room temperatures for many months without any appreciable curing and can then be put to use to make insulated rail joints equal in quality to those made with freshly prepared bonding sheets of the invention. Whether freshly prepared or after long-time storage, the resin compositions of the bonding sheets fully cure to a strong, tough thermoset state when heated to about 140° C. for 25 minutes or somewhat less.

A preferred 1,2-epoxy resin is a polyglycidyl ether of a polyhydric phenol such as a condensation product of bisphenol A and epichlorohydrin. These are readily available at moderate cost from a number of sources, e.g., "Epon" 1001 and "Araldite" 6071 which have a Durrans' softening point of about 70° C., and "Epon" 1004 and "Araldite" 6084 which have a Durrans' softening point of about 100° C. Another useful polyglycidyl ether is "Epon" 1310 which is the condensation product of 1,1,2,2-tetrakis(4-hydroxyphenyl)ethane and epichlorohydrin having an average of about 3 oxirane groups per molecule and a Durrans' softening point of about 77°-80° C. Another useful class of 1,2-epoxy resins is the polyglycidyl novolaks, e.g., Ciba Products ECN 1273, 1280 and 1299 which respectively have Durrans' softening points of 73°, 80° and 99° C.

The preferred dianiline is methylene dianiline which melts at 90° C. and is readily available at reasonable cost. Mixtures of 1,2-epoxy resin and methylene dianiline powders provide a highly desirable combination of properties when fused by heating. First, they remain liquid for a sufficiently long period of time to permit an insulated rail joint to be assembled with the rails preheated above the temperature at which the mixture fuses. Then the fused mixture cures to nearly full strength very quickly after gelling. Also, the times to gel and cure are only moderately affected by differences in temperature, so that the strength of the bonded rail joint is not noticeably affected if the preheating of the rails is not uniform. This can be better appreciated from the following data for a blend of approximately stoichiometrically equivalent amounts of methylene dianiline and a polyglycidyl ether of bisphenol A which has a Durrans' softening point of 80° C.

| Temperature | Time to Gel (minutes) | Total time for substantially complete cure (minutes) |
|---|---|---|
| 120° | 11.2 | 25 |
| 135° | 8.2 | 20 |
| 150° | 7.0 | 15 |

Loosely woven glass cloth which can be readily saturated with a melted resin composition is preferred as the reinforcing fabric of the novel bonding sheet. Nylon netting is also useful but is somewhat more expensive. Because it is less resistant to moisture, it should not be used in areas of prolonged high humidity or where there is considerable ground water. Nonwoven polyester mats should also be useful.

Conveniently, the epoxy resin and the dianiline in fine powder form are dry-mixed and coated onto a continuous carrier which has a low-adhesion surface and is then drawn across a plate heated to a temperature about 25°–50° C. above the fusing temperature of the mixture of powders. The fused coating is squeezed into the reinforcing fabric to saturate the fabric with a resin composition which is quickly cooled before there is any appreciable reaction between the epoxy resin and the dianiline. In order to provide an intimate blend by merely fusing the mixed powders for a brief period of time, the maximum particle size of the epoxy resin and dianiline powders should be small, and preferably is about 10 micrometers. Although there is a cost saving by using larger particle sizes, the particle size of substantially all of the powder mixture should be less than 20 micrometers. At an average powder size of 40–60 micrometers, there was about 30% reduction in mechanical properties as compared to results using a maximum particle size of 10 micrometers.

Another convenient method for making the novel bonding sheet is to fuse the epoxy resin and the dianiline separately and to extrude them continuously through twin mixing extruders onto a continuous reinforcing fabric which is backed by a low-adhesion carrier. The resultant composite is immediately chilled to prevent any appreciable reaction between the epoxy resin and the dianiline.

THE DRAWING

Figure 2:
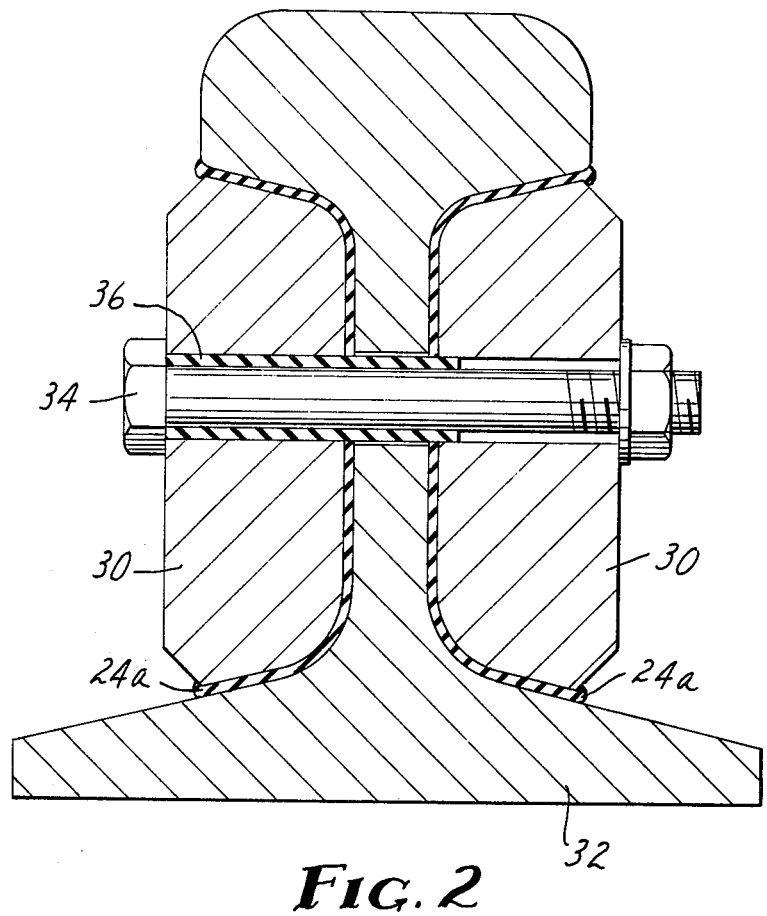

In the drawing:

FIG. 1 schematically shows apparatus for making the fabric-reinforced bonding sheet of the invention and FIG. 2 is a vertical section through an insulated rail joint made with the fabric-reinforced bonding sheet produced on the apparatus of FIG. 1.

As seen in FIG. 1, a mixture 10 of epoxy resin and dianiline powders is coated onto the low-adhesion surface of a continuous carrier 12. A more uniform coating is obtained if the coater knife 14 is vibrated. The powder-bearing carrier is drawn over a metal plate 16 which is sufficiently hot to fuse the powder coating. Preferably the temperature of the plate 16 is maintained about 35°–50° C. above the temperature at which both the dianiline melts and the epoxy resin becomes a free-flowing liquid.

A continuous reinforcing fabric 17 and another low-adhesion carrier 18 are drawn around a steel drum 20 which is heated internally with recirculating oil to maintain its surface at a temperature which may be slightly lower than that of the plate 16. The fused epoxy-dianiline composition 19 is squeezed into the heated fabric 17 both by the winding tension on the carrier 12 and by the rubber-covered pressure roll 21. The resultant composite is drawn around an internally cooled chilling roll 22. This solidifies the fused resin composition to provide a fabric-reinforced bonding sheet 24 which is removably adhered to the carriers 12 and 18 and is wound up with the carriers while the resin composition is still warm enough so that the boiling sheet is supple, preferably somewhat below 45° C.

By moving the carriers 12 and 18 at a rate of about 3 cm/second, the resin composition is a liquid for only about 60 seconds. Hence, there is no substantial reaction between the epoxy resin and the dianiline. If stored at ordinary room temperatures, the fabric-reinforced bonding sheet should remain fully useful for a period of a year or more since essentially no reaction takes place between the epoxy resin and the dianiline.

In order to make an insulated rail joint as shown in FIG. 2, one or more layers cut from the fabric-reinforced bonding sheet 24 are warmed and formed in a wooden mold to provide a pair of pre-forms 24a which fit the facing surfaces of a pair of joint bars 30 and rails 32 (one of which is shown). Holes punched into the pre-form receive bolts 34 and insulating bushings 36.

In a field assembly, after the facing surfaces of the bars 30 and rails 32 have been cleaned and heated, an adhesion-promoting primer layer may be applied to those surfaces, e.g., a dilute solution of the epoxy-dianiline mixture 10 in a quick-evaporating solvent. The punched pre-forms 24a are then put into place and the bolts 34 are tightened. If the temperature of the facing surfaces is at least 50° C. higher than the higher of the softening point of the epoxy resin and the melting point of the dianiline, this should be sufficient to cure the resin composition of the pre-forms without applying any additional heat. However, the facing surfaces should not be heated to more than 80° C. higher than the higher of the softening and melting points in order to avoid thermal expansion problems. Furthermore, higher temperatures would reduce the time before the resin composition starts to gel.

The following example employs a high-melting 1,2-epoxy resin which is a condensation product of epichlorohydrin and bisphenol A having a Durrans' softening point of 75°–85° C. and an epoxide equivalent weight of about 550 (e.g., "Epon" 1002). The example employs a heavy open-weave fabric of glass fibers which have a finish compatible with epoxy resin (e.g., Clark-Schwebel Style 1589, "Volan" finish).

EXAMPLE

By weight 100 parts of the above-described epoxy resin in powder form, 7.9 parts of methylene dianiline flakes, 4 parts of fumed silica ("Cabosil" M5) and 10 parts zinc chromate powder were ground in a ball mill to an average particle size of 10 micrometers. This powder was applied to the glass fabric using the apparatus shown in FIG. 1 of the drawing under the following conditions:

| | |
|---|---|
| Carriers 12 and 18 | Silicone-treated kraft paper |
| Orifice of coater knife 14 | 1.2 mm |
| Plate 15 surface temperature | 120°–135° C. |
| Drum 20 surface temperature | 105°–120° C. |
| Roll 22 surface temperature | 0° C. |
| Thickness of fabric-reinforced bonding sheet 24 | 0.55 mm |

After stripping off the two low-adhesion carriers, one layer of the fabric-reinforced bonding sheet was used to bond two steel plates 1.6 mm in thickness using a heated platen press for 20 minutes at 138 kPa and 138° C. The resultant laminate exhibited an overlap shear strength (ASTM D1002) of 15,900 kPa. When the test was modified to avoid any peeling action, the steel plates yielded. When using heavier steel plates while avoiding any peeling action, the overlap shear strength was 41,400 kPa.

Pre-forms consisting of three layers of the fabric-reinforced bonding sheet were used to make an insulated rail joint for welded track of 132-pound/yard size using steel joint bars as shown in FIG. 2. The length of the insulated rail joint was about one meter. Before making the joint, the rails and joint bars were heated with a torch to about 100° C., their facing surfaces were sandblasted, and the dust was blown away with compressed air. The rails and joint bars were then further heated with the torch to 150° C., and those surfaces were primed with 10% solution in methyl ethyl ketone of the same resin composition as that of the fabric-reinforced bonding sheet. The pre-forms were laid on the heated joint bars, and these were quickly bolted onto the heated rails. The bolts were torqued to 1000 foot-pounds (140 m-kg), and the adhesive flowed out to form small fillets as seen in the drawing.

The fabric-reinforced bonding sheet of this Example is especially useful for making insulated rail joints in the field, because it is so convenient to make the adhesive bond and because the bond reaches virtually full strength quickly. The resin composition does not gel for 7–8 minutes at 135°–150° C., thus providing adequate time to torque the bolts while the resin composition is still fluid. After the composition gels, substantially full bonding strength is reached in about 8–12 minutes, so that the track can be put back into service as soon as the rails have cooled moderately, primarily by conduction of the heat into the rails and the steel parts of the joint.

I claim:

1. A pre-form which fits the facing surfaces of the joint bar and rails of a rail joint and comprises at least one layer of a fabric-reinforced bonding sheet comprising at least one layer of a reinforcing fabric saturated with a resin composition comprising an intimate blend of (a) 1,2-epoxy resin having a Durrans' softening point of 50°–110° C. and (b) within 15% by weight of an equivalent amount of a dianiline having a melting point of 50°–110° C., which bonding sheet can be stored for months at ordinary room temperatures but its resin composition fully cures at any time to a strong, tough thermoset state when heated to about 140° C. for about 25 minutes.

2. A pre-form as defined in claim 1 wherein the epoxy resin is a polyglycidyl ether of bisphenol A.

3. A pre-form as defined in claim 1 wherein the dianiline is methylene dianiline.

4. A pre-form as defined in claim 1 wherein the reinforcing fabric is a heavy open-weave fabric of glass fibers.

5. A pre-form as defined in claim 1 wherein the viscosity of the epoxy resin at the temperature at which the dianiline melts approximates that of the dianiline.

6. A pre-form as defined in claim 1 formed with holes to receive the bolts of a rail joint.

7. A rail joint comprising a pair of rails, a pair of joint bars, means bolting the joint bars to the rails, and a fabric-reinforced cured resin composition bonding the joint bars to the rails, wherein the improvement comprises:
   said cured resin composition is the cured product of a mixture of (a) 1,2-epoxy resin having a Durrans' softening point of 50°–110° C. and (b) within 15% by weight of an equivalent amount of a dianiline having a melting point of 50°–110° C.

8. Method of making an insulated rail joint using a pair of pre-forms as defined in claim 6, which method comprises the steps of:
   (a) cleaning the facing surfaces of a pair of joint bars and a pair of rails which have been formed to receive bolts,
   (b) heating the rails and joint bars so that the temperature of their facing surfaces is about 50°–80° C. higher than the higher of the softening point of the epoxy resin and the melting point of the dianiline,
   (c) assembling the rails and joint bars with one of said pre-forms between each set of facing surfaces, and
   (d) inserting bolts with insulated bushings and tightening the bolts before the resin composition of the bonding sheet begins to gel.

9. Method of making an insulated rail joint as defined in claim 8 including the further step following step (b) of applying an adhesion-promoting primer layer to said facing surfaces.

10. Method of making an insulated rail joint as defined in claim 9 wherein said further step involves applying a dilute solution in a quick-evaporating solvent of essentially the same resin composition as that of the fabric-reinforced bonding sheet.

11. Method of making a fabric-reinforced bonding sheet comprising the steps of
   (1) providing a powder mixture, substantially all of which has a particle size less than 20 micrometers, comprising
      (a) 1,2-epoxy resin having a Durrans' softening point of 70°–110° C. and
      (b) within 15% by weight of an equivalent amount of a dianiline having a melting point of 70°–110° C.,
   (2) fusing the powder mixture to provide an intimate blend,
   (3) immediately saturating a reinforcing fabric with the fused blend, and
   (4) quickly cooling the blend before there is any appreciable reaction between the epoxy resin and the dianiline to provide a fabric-reinforced bonding sheet.

12. Method of making a fabric-reinforced bonding sheet as defined in claim 11 wherein the epoxy resin is a polyglycidyl ether of bisphenol A.

13. Method of making a fabric-reinforced bonding sheet as defined in claim 11 wherein the dianiline is methylene dianiline.

* * * * *